United States Patent
Malik et al.

(10) Patent No.: US 11,688,529 B2
(45) Date of Patent: Jun. 27, 2023

(54) SEMI-CONDUCTIVE POLYMER COMPOSITION

(71) Applicants: Muhammad Ali Malik, Stenungsund (SE); Christer Svanberg, Kallered (SE); Thomas Gkourmpis, Gothenburg (SE); Takashi Uematsu, Stenungsund (SE); Roger Carlsson, Save (SE); Niklas Thorn, Stenungsund (SE); Jenny-Ann Ostlund, Torslanda (SE)

(72) Inventors: Muhammad Ali Malik, Stenungsund (SE); Christer Svanberg, Kallered (SE); Thomas Gkourmpis, Gothenburg (SE); Takashi Uematsu, Stenungsund (SE); Roger Carlsson, Save (SE); Niklas Thorn, Stenungsund (SE); Jenny-Ann Ostlund, Torslanda (SE)

(73) Assignee: BOREALIS AG, Vienna (AT)

( * ) Notice: Subject to any disclaimer, the term of this patent is extended or adjusted under 35 U.S.C. 154(b) by 599 days.

(21) Appl. No.: 14/374,408

(22) PCT Filed: Jan. 31, 2013

(86) PCT No.: PCT/EP2013/000283
§ 371 (c)(1),
(2) Date: Jul. 24, 2014

(87) PCT Pub. No.: WO2013/120582
PCT Pub. Date: Aug. 22, 2013

(65) Prior Publication Data
US 2015/0004411 A1   Jan. 1, 2015

(30) Foreign Application Priority Data
Feb. 16, 2012 (EP) .................................. 12001032

(51) Int. Cl.
*H01B 9/02* (2006.01)
*C08L 23/12* (2006.01)
(Continued)

(52) U.S. Cl.
CPC ............... *H01B 9/027* (2013.01); *C08K 3/04* (2013.01); *C08L 23/0853* (2013.01);
(Continued)

(58) Field of Classification Search
CPC .. C08L 23/0869; C08L 23/10; C08L 23/0853; C08L 23/08; C08L 23/16;
(Continued)

(56) References Cited

U.S. PATENT DOCUMENTS 3,770,531 A * 11/1973 Craft ....................... H01L 24/26
156/153
3,951,871 A    4/1976 Lloyd et al.
(Continued)

FOREIGN PATENT DOCUMENTS

EP       2 365 010       9/2011
JP       57158906 A  *  9/1982
WO      WO 2011/154287  12/2011

OTHER PUBLICATIONS

Abstract Machine Translation: Kakizaki et al. (JP 57-158906).*
(Continued)

*Primary Examiner* — Holly Rickman
*Assistant Examiner* — Linda N Chau
(74) *Attorney, Agent, or Firm* — Lippes Mathias LLP

(57) ABSTRACT

The present invention relates to a semi-conductive polymer composition, the present invention provides a semi-conductive polymer composition comprising an ethylene copolymer comprising polar co-monomer units; an olefin homo- or copolymer; and a conductive filler; wherein the olefin homo- or copolymer has a degree of crystallinity below 20%. The
(Continued)

Figure 1:
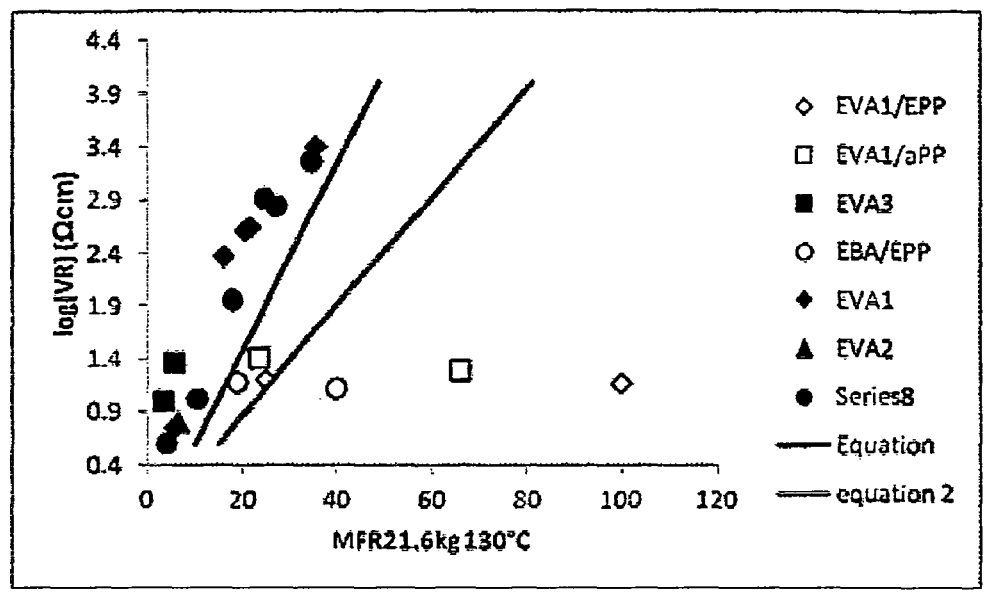

invention also relates to a wire or cable comprising said semi-conductive polymer composition, and to the use of said composition for the production of a layer, preferably a semi-conducting shield layer of a wire or cable.

18 Claims, 1 Drawing Sheet

(51) Int. Cl.
    *H01B 1/24*     (2006.01)
    *C08L 23/08*     (2006.01)
    *C08K 3/04*     (2006.01)
    *C08L 23/14*     (2006.01)
    *H01B 13/24*     (2006.01)
    *H01B 3/00*     (2006.01)

(52) U.S. Cl.
    CPC ........... *C08L 23/0869* (2013.01); *C08L 23/12* (2013.01); *C08L 23/14* (2013.01); *H01B 1/24* (2013.01); *H01B 13/24* (2013.01); *C08L 2205/02* (2013.01); *H01B 3/004* (2013.01); *Y10T 428/2933* (2015.01)

(58) Field of Classification Search
    CPC .. C08L 2666/02; C08L 51/06; C08L 2205/02; C08L 2207/02; C08F 255/02; C08F 222/06; C08K 3/0033; C08K 2201/001; H01B 9/027
    See application file for complete search history.

(56) References Cited

U.S. PATENT DOCUMENTS

2010/0300727 A1* 12/2010 Sultan .................... H01B 3/441
    174/110 SR
2011/0114365 A1* 5/2011 Torgersen ........... C08L 23/0869
    174/120 SC
2013/0161059 A1* 6/2013 Steffl ..................... C08F 255/02
    174/105 SC

OTHER PUBLICATIONS

Penn State University (Chemistry 112—Supplementary Reading: Polymers).*
English Machine Translation: Kakizaki et al. (JP 57-158906) (Year: 1982).*
International Search Report dated Mar. 7, 2013 for International Application No. PCT/EP2013/000283.
Written Opinion dated Mar. 7, 2013 for International Application No. PCT/EP2013/000283.
International Preliminary Report on Patentability completed Feb. 10, 2014 for International Application No. PCT/EP2013/000283 .
Nam, et al., "Properties of Isotactic Polypropylene/Atactic Polypropylene Blends", *Macromolecular Research*, vol. 23, No. 9, pp. 809-813, 2015.

* cited by examiner

SEMI-CONDUCTIVE POLYMER COMPOSITION

The present invention relates to a semi-conductive polymer composition, to a wire or cable comprising said semi-conductive polymer composition, and to the use of said composition for the production of a layer, preferably a semi-conducting shield layer of a wire or cable.

A typical electrical power cable or wire generally comprises one or more conductors in a cable core, which is surrounded by one or more insulation layers or sheaths of polymeric material. The core is typically copper or aluminium but it may also be non-metallic, surrounded by a number of different polymeric layers, each serving a specific function, e.g. a semi-conducting shield layer, an insulation layer, a metallic tape shield layer and a polymeric jacket. Each layer can provide more than one function. For example, low voltage wire or cable are often surrounded by a single polymeric layer that serves as both an insulating layer and an outer jacket, while medium to extra-high voltage wire and cable are often surrounded by at least separate insulating and jacket layers. A power cable core may for example be surrounded by a first polymeric semi-conducting shield layer, a polymeric insulating layer, a second polymeric semiconducting shield layer, a metallic tape shield, and a polymeric jacket.

Generally semi-conductive shields are used to provide layers of intermediate conductivity between the high potential conductor and the primary insulation, and between the primary insulation and the ground.

Semi-conductive shields may be either bonded to the insulation layer or strippable. The inner semi-conductive shield is usually bonded to the insulation layer whereas the outer semi-conductive shield is often strippable.

A wide variety of polymeric materials have been utilized as semiconducting shield materials for power cables. Typical inner semi-conductive shield layers comprise a polar ethylene copolymer, such as ethylene-vinyl acetate copolymer (EVA), ethylene methylacrylate copolymer (EMA), ethylene ethylacrylate copolymer (EEA), ethylene butylacrylate copolymer (EBA) and conductive filler, such as carbon black.

A common concept for making a semi-conductive layer strippable is to increase the polarity of the semi-conductive layer. This is e.g. done by the addition of highly polar acrylonitrile-butadiene rubber (NBR) to the semi-conductive composition and sufficient carbon black to render the composition semi-conductive. However, NBR has been demonstrated to cause significant loss of adhesion between the semi-conductive strippable layer and the insulation layer when the cable is subjected to thermal aging. Loss of adhesion causes the power cable not to meet the required specifications.

Another approach for making a semi-conductive layer strippable is to use high amounts of ethylene polar copolymer. However, high amounts of ethylene polar copolymer combined with a high amount of filler are particularly difficult to extrude, due to the high viscosity of the composition. High production costs have to be faced.

To decrease the viscosity of the polymer composition, EP 2128195 proposes adding a secondary polymer phase to the polymer composition comprising an ethylene copolymer comprising polar co-monomer units and a conductive filler. The secondary polymer phase is an olefin copolymer comprising propylene monomer units and ethylene monomer units wherein the olefin copolymer has a melting point of 110° C. or less and it is prepared using a metallocene polymerization catalyst. However, the melting point of the first polymer phase and the second polymer phase should differ by at most ±10° C. to ensure good processing ability (i.e. both phases of the composition melt and flow together at the same physical form). This imposes great restrictions on the selection of the secondary polymer phase.

Although prior art compositions for semi-conductive shield layers are satisfactory for many applications, there is always the need to improve their processability and reduce their production costs.

For example, preferably the amount of conductive filler is decreased as even small changes may dramatically affect compounding efficiency and consistency during full scale production.

It is an object of the present invention to provide a semi-conductive polymer composition, having the required volume resistivity and the specified mechanical properties to be suitable for a semi-conductive layer of a power cable and being at the same time easily processable, and allowing reduced processing costs This is achieved by adding to an ethylene copolymer comprising polar co-monomer units and to the conductive filler, a secondary polymeric phase, which does not need to melt. In fact, by altering the polymer composition according to the invention, the ability to process and extrude the material can be fined tuned while keeping the electrical performance at equal or similar levels.

In one aspect, the present invention provides a semi-conductive polymer composition comprising:
(A) an ethylene copolymer comprising polar co-monomer units;
(B) an olefin homo- or copolymer;
(C) a conductive filler;
wherein the olefin homo- or copolymer (B) has a degree of crystallinity below 20%.

According to a preferred embodiment, the olefin homo- or copolymer (B) has a degree of crystallinity below 12%, more preferably equal or below 10%, even more preferably below 5%, 2%, 1% or 0.8%. Even more preferably the olefin homo- or copolymer (B) has a degree of crystallinity below 0.5%.

In fact, if component (B) has high level of crystallinity then in order to ensure good processing ability (i.e. both phases of the composition melt and flow together at the same physical form) the melting temperature of the two polymers (A) and (B) has to be quite similar (usually within 10° C.). In the case where the level of crystallinity of component (B) is low, the need for restrictions on the melting temperature of component (B) in comparison with component (A) is eliminated. The reason for this is that although (B) exhibits a level of crystallinity, the crystals are so few in comparison with the rest of the amorphous part that one can afford to have them melting at significantly high temperatures as this does not create significant processing-related problems.

Preferably the olefin homo- or copolymer (B) is a propylene homo- or copolymer, more preferably is atactic-polypropylene or an ethylene-propylene copolymer (EPP).

The olefin homo- or co-polymer (B) is preferably present in the composition in an amount between 5 and 25% based on the total weight of the polymer composition. In particular, the amount of (B) should be selected to preserve the mechanical strength and the melt strength of the polymer composition.

Preferably the polar co-monomer in the ethylene copolymer (A) is selected from the group consisting of acrylic acids, methacrylic acids, acrylates, methacrylates, and vinyl esters. Preferably the ethylene copolymer (A) is a vinyl acetate, acrylate or methacrylate copolymer, even more preferably the ethylene copolymer (A) is an acrylate more preferably an ethylene-methyl acrylate copolymer (EMA).

Preferably the conductive filler is present in the composition in an amount below 37% based on the total weight of the polymer composition. According to one embodiment of the invention the conductive filler (C) is carbon black.

Advantageously, the conductive filler is preferentially located in the ethylene copolymer (A).

Preferably the $MFR_{(21.6\ Kg\ 130°\ C.)}$ of the polymer composition satisfies the following relationship:

$$MFR_{(21.6\ Kg\ 130°\ C.)} \geq 11.5 \times \log (VR) \text{ or even more preferably:}$$

$$MFR_{(21.6\ Kg\ 130°\ C.)} \geq 19.5 \cdot VR + 3.$$

The polymer composition of the invention preferably has a $MFR_{(21.6\ Kg\ 130°\ C.)}$ higher than 15 g/10 min.

In another aspect the present invention provides a wire or cable comprising the polymer composition of the invention. Preferentially the wire or cable comprises a conductor layer, an insulation layer and at least one semi-conductive layer, wherein said semi-conductive layer comprises the polymer composition of the invention.

In a further aspect the present invention is directed to the use of the polymer composition of the invention in the production of a semi-conductive layer of a wire or cable.

The present invention is also directed to a process for producing of a wire or cable comprising extruding a semi-conductive layer with the composition of the invention.

DETAILED DESCRIPTION

The semi-conductive polymer composition according to the present invention comprises an ethylene copolymer (A) comprising polar co-monomer units. Preferably the polar co-monomers are selected from the group consisting of acrylic acids, methacrylic acids, acrylates, methacrylates, and vinyl esters. More preferably, the polar co-monomers are selected from the group consisting of acrylic acids; alkyl acrylates, preferably $C_1$- to $C_6$-alkyl acrylates or of $C_1$- to $C_4$-alkyl acrylates; alkyl methacrylates, preferably $C_1$- to $C_6$-alkyl methacrylates or of $C_1$- to $C_4$-alkyl methacrylates; and vinyl acetate.

For example, the polar co-monomers may be selected from the group of alkylesters of (meth)acrylic acid, such as methyl, ethyl and butyl(meth)acrylate and vinyl acetate. In a particularly preferred embodiment, the ethylene copolymer (A) is selected from the group consisting of ethylene vinyl acetate copolymer (EVA), ethylene-methyl acrylate copolymer (EMA), ethylene-ethyl acrylate copolymer (EEA), ethylene butyl acrylate copolymer (EBA), ethylene-methacrylic acid copolymer (EMAA) and ethylene acrylic acid copolymer (EAA) most preferably the ethylene copolymer (A) is an ethylene-methyl acrylate copolymer (EMA).

Preferably, the ethylene copolymer (A) comprising polar co-monomer units is prepared by copolymerizing ethylene and at least a polar co-monomer mentioned above. However, it may also be produced by grafting the polar co-monomer onto the homo- or copolymer backbone.

When the polar copolymer is prepared by copolymerizing ethylene with a polar co-monomer, this is preferably affected in a high pressure process resulting in low density ethylene copolymer.

Preferably, component (A) has a polar co-monomer content from 5 to 35 wt %, more preferably from 10 to 30 wt % or even more preferably from 15 to 25 wt %.

Preferably component (A) has a melt flow rate $MFR_{(2.16\ kg,\ 190°\ C.)}$ of 0.1 to 100 g/10 min, more preferably of 1 to 60 g/10 min and most preferably of 5 to 50 g/10 min, and most preferably 15 to 50 g/10 min.

In the composition of the invention, preferably the amount of component (A) is from 30 to 75 wt. % of the total polymer composition, more preferably is from 40 to 70 wt. % and most preferably is from 45 to 65 wt. %.

The ethylene copolymer (A) comprising polar co-monomer units may further comprise unit containing an epoxy group. Such unit is referred herein as an "epoxy-group-containing monomer unit" and means an unsaturated compound comprising an epoxy group. Such compounds can be used as co-monomers for copolymerising epoxy-containing monomers units to the ethylene copolymer (A) or can be grafted to the ethylene copolymer (A), as well known in the polymer field. Grafting and copolymerizing of epoxy-group containing monomer units can be made according to or analogously to the methods described in the literature. The ethylene copolymer (A) containing epoxy groups as well as the epoxy-group-containing monomer units are very well known (mentioned e.g. in JP 06-116362 of Nippon Petrochem Co. LTD and WO 2010040964 of Arkema France) and commercially available. As preferable examples of epoxy-containing monomer units, e.g. aliphatic esters and glycidyl ethers such as an allyl glycidyl ether, a vinyl glycidyl ether, a maleate or itaconate of glycidyl, a (meth)glycidyl acrylate, and alicyclic esters and glycidyl ethers, such as a 2-cyclohexene-1-glycidylether, a cyclohexene-4,5-diglycidyl carboxylate, a cyclohexene-4 glycidyl carboxylate, a 5-norbornene-2-methyl-2-glycidyl carboxylate and a endo cis-bicyclo(2,2,1)-5-heptene-2,3-diglycidyl dicarboxylate, can be mentioned.

It is reasonable to assume that by using a cheaper component (A) even lower production cost may be achieved. The reason for this is that, the MFR of component (A) is often of almost irrelevance to the final composition, as the high MFR of component (B), e.g. ethylene-propylene copolymer and atactic-polypropylene, will boost the final value of the mixture. Furthermore the difference in component (A) in co-polar co-monomer content is believed to affect predominantly the crystallinity of the system. Such an effect can be controlled by adjusting the conductive filler levels to appropriate values in order to ensure that volume resistivity levels and other mechanical properties are kept within the required range.

The polymer composition of the present invention further comprises an olefin homo- or copolymer (B) having a degree of crystallinity when measured by differential scanning calorimetry (DSC), below 20%, preferably below 12%, more preferably equal or below 10%, even more preferably below 5%, 2%, 1% or 0.8%. According to a preferred embodiment the olefin homo- or copolymer (B) has a degree of crystallinity below 0.5%.

more preferably below 5%, even more preferably below 2% or 1% Even more preferably the olefin homo- or copolymer (B) has a degree of crystallinity below 0.8%.

The degree of crystallinity measures the fraction of the ordered molecules in a polymer. Methods to evaluate the degree of crystallinity include density measurement, differential scanning calorimetry (DSC), X-ray diffraction (XRD), infrared spectroscopy and nuclear magnetic resonance (NMR). The measured value depends on the method used, which is therefore quoted together with the degree of crystallinity. In addition to the above integral methods, the distribution of crystalline and amorphous regions can be visualized with microscopic techniques, such as polarized light microscopy and transmission electron microscopy.

Preferably the olefin homo- or copolymer (B) is highly amorphous at room temperature. Preferably it has a glass transition temperature below 5° C.

The olefin homo- or copolymer (B) preferably has a melt flow rate (MFR) of 50 higher.

The average molecular weight (Mw) of the olefin homo- or copolymer (B) is preferably below 50,000. Even more preferably the Mw of the olefin homo- or copolymer (B) is preferably below 35,000. Indeed, it has been found that when the Mw is below the mentioned values, the polymer composition may be processed more easily and better properties are achieved.

Advantageously, component (B) is a homo- or copolymer of a $C_2$-$C_4$ olefin.

According to a preferred embodiment the olefin homo- or copolymer (B) is a propylene homo- or copolymer. Most preferably the propylene homo- or copolymer (B) is atactic-polypropylene (aPP) or an ethylene-propylene copolymer (EPP).

Atactic means that the methyl groups are placed randomly on both sides of a polymer chain. In the context of the present invention, atactic-polypropylene means a propylene homopolymer having an atactic component higher than 50%, preferably higher than 60%, even more preferably higher than 65, most preferably equal or higher than 70%.

For ethylene-propylene copolymer (EPP) is meant a copolymer comprising at least 50%, preferably at least 65, more preferably at least 80, most preferably at least 90 wt % of polypropylene units. The ethylene-propylene copolymer (EPP) preferably has an isotactic component higher than 50%, preferably higher than 60%, even more preferably higher than 70%, most preferably equal higher than 75%.

The use of aPP is particularly attractive, since it is predominantly amorphous. This minimises concerns regarding the melting temperature and extrusion temperature. Furthermore aPP suitable for the polymer composition of the present invention has a cost significantly reduced with respect to most of polymer used as component (A). Atactic polypropylene may also be a waste product of different polymeric processes, and would therefore be recycled. Therefore by adding aPP to component (A) and to the conductive filler processing improvement are achieved, for a small sacrifice in electrical performance, at a substantially reduced cost.

By adding EPP to component (A) and to the conductive filler significant performance enhancement in terms of electrical and processing performance are achieved, while keeping the price at a similar level as the pure ethylene copolymer-comprising polar co-monomer units.

Normally, the melting point of the ethylene copolymer comprising polar co-monomer units (A) and the melting point of the olefin homo- or copolymer (B) should differ by at most of ±10° C. If a polymer composition according to claim 1 is used there may be greater differences in melting temperature between component A and B.

It is further advantageous that the olefin homo- or copolymer (B) is present in the polymer composition in an amount between 1 and 30 wt %, preferably between 3 and 20 wt %, even more preferably between 5 and 10 wt % of the total polymer composition.

The semi-conductive polymer composition of the invention further comprises conductive filler, preferably carbon black. Any carbon black may be used which is electrically conductive. Examples of carbon blacks include furnace blacks and acetylene blacks. Furnace blacks are particularly preferred.

Suitable furnace blacks may have a primary particle size less than 29 nm measured according to ASTM D-3849. Many suitable furnace blacks of this category are characterized by an iodine number between 60 and 300 mg/g according to ASTM D-1510 and an oil absorption number between 50 and 200 ml/100 g according to ASTM D-2414.

Suitable furnace blacks may have a primary particle size of greater than 28 nm measured according to ASTM D-3849. Many suitable furnace blacks of this category are characterized by an iodine number between 30 and 200 mg/g according to ASTM D-1510 and an oil absorption number between 80 and 300 ml/100 g according to ASTM D-2414.

Suitable carbon blacks for semi-conductive cable layers are preferably characterized by their cleanliness. Therefore, preferred carbon blacks have an ash-content of less than 0.2 wt % measured according to ASTM-1506, a 325 mesh sieve residue of less than 30 ppm according to ASTM D-1514 and have less than 1 wt % total sulphur according to ASTM-1619.

Most preferred are extra-clean furnace carbon blacks having an ash-content of less than 0.05 wt. % measured according to ASTM-1506, a 325 mesh sieve residue of less than 15 ppm according to ASTM D-1514 and have less than 0.05 wt. % total sulphur according to ASTM-1619.

The amount of the conductive filler is at least such that a semiconducting composition is obtained. Depending on the desired use and conductivity of the composition, the amount of the conductive filler may vary.

Preferably the polymer composition comprises 10 to 50 wt % of the total polymer composition of conductive filler. More preferably the amount of conductive filler is lower than 37 wt %, even more preferably the amount of conductive filler is 36 wt % or lower, 35 wt % or lower and most preferably lower it is than 33 wt %.

According to a preferred embodiment the conductive filler is present in an amount of at least 10 wt %, preferably at least 20 wt % even more preferably in an amount of at least 30 wt %.

Based on AFM (Atomic Force Microscopy) results, it appears that the inherent immiscibility between component (A) and (B) creates a two phase system in which the conductive filler exhibits preferential localization in the component (A) phase. By preferential localization it is meant that the major part of the conductive filler is located in component (A). This localization constrains the mobility and dynamics of component (A). The conductive filler particles well dispersed in the component (A) create a conductive pathway that allows current to flow. The component (B) areas act as insulators since it is energetically not favourable for the conductive filler particles to localise themselves. At last, there are areas where despite the presence of the conductive filler particles non conductive pathways can be created, the reason been that in these areas the conductive filler particles tend to coalesce and agglomerate leading to a distinct macro-phase separation between them and their host polymer system. Therefore by adding a secondary phase according to the invention, i.e. component (B), to the known system of component (A) and conductive filler, the volume available to component (A) and component (A)/filler phase is restricted. This limitation and existence of such a large surface area of the filler appear to change the morphological characteristics of the system, which is manifested in the broadening of the crystallization peak of the composition and the overall level of crystallinity that turns out to be reduced. By altering the polymer composition the ability to process and extrude the material can be fined tuned, while keeping the electrical performance at equal or similar levels.

Processing comprises both a compounding step of the composition as well as the extrusion into a layer of a cable.

Advantageously the polymer composition of the present invention does not comprise NBR, which has a chewing-gum like consistency and thus gives rise to handling and dosing problems. Further in compositions containing NBR processing aids, parting agents are necessary to obtain a homogeneous final tree flowing composition. When using the olefin copolymer in the composition according to the present invention, the disadvantages due to the stickiness of NBR are overcome, thus the above additives may be omitted or their amount may be reduced.

The semi-conductive polymer composition may further comprise a cross-linking agent. The cross-linking agent, e.g. peroxide, is preferably added in an amount of less than 3.0 wt %, preferably of less than 2 wt % based on the total polymer composition.

Suitable peroxides used for cross-linking, the following compounds are: di-tert-amylperoxide, 2,5-di(tert-butylperoxy)-2,5-dimethyl-3-hexyne, 2,5-di(tert-butylperoxy)-2,5-dimethylhexane, tert-butylcumylper-oxide, di(tert-butyl) peroxide, dicumylperoxide, di(tert-butylperoxy-isopropyl) benzene, butyl-4,4-bis(tert-butylperoxy)valerate, 1,1-bis(tert-butylperoxy)-3,3,5-trimethylcyclohexane, tert-butylperoxybenzoate, diben-zoylperoxide.

The semi-conductive polymer composition may comprise further additives. As possible additives, antioxidants, scorch retarders, cross-linking boosters, stabilisers, processing aids, flame retardant additives, acid scavengers, inorganic fillers, voltage stabilizers, additives for improving water tree resistance, or mixtures thereof can be mentioned.

It is also possible to addition small amount, preferably 15% or less, of one or more fillers in addition to the conductive filler mentioned above. Fillers can also act as an acid scavenger. If for example, ethylene vinylacetate is used as a copolymer in the semi-conductive formulation, above 150° C. forms acid which provokes an increased risk for corrosion of processing equipment. Basic, preferably inorganic fillers neutralise the acid and reduce the acid corrosion attack. Suitable filler materials may be selected from the group consisting of calcium carbonate, talc, mica, wollastonite, barium sulfate, calcite, and hydrotalcite.

The polymer composition of the present invention feature increased performance in terms of processing with and decrease of costs. In particular the polymer composition of the invention preferably has a $MFR_{(21.6\ Kg\ 130°\ C.)}$ higher than 15 g/10 min.

Furthermore the polymer composition of the present invention features comparable volume resistivity (VR) despite lower conductive filler concentration.

Preferably the $MFR_{(21.6\ Kg\ 130°\ C.)}$ of the polymer composition of the present invention satisfies the following relationship:

$$MFR_{(21.6\ Kg\ 130°\ C.)} \geq 11.5 \times \log(VR) \text{ or even more preferably:}$$

$$MFR_{(21.6\ Kg\ 130°\ C.)} \geq 9.5 * VR + 3.$$

The semi-conductive polymer composition according to the invention is preferably prepared by mixing together the components by using any suitable means such as conventional compounding or blending apparatus, e.g. a Banbury Mixer, a 2-roll rubber mill or a twin screw extruder, Buss co-kneader, etc. The compounding temperature is typically in a range of 120° C. to 200° C.

The present invention also pertains to an electric power cable comprising a semiconducting layer formed by the semi-conductive composition as described above.

In the context of the present invention, a wire or cable is defined to be a cable transferring energy operating at any voltage. The voltage applied to the cable can be alternating (AC), direct (DC), or transient (impulse). According to one embodiment of the present invention the multilayered article is a wire or cable operating at voltages higher than 1 kV, preferably higher than 23 kV.

The semi-conductive polymer composition according to the invention is preferably extruded to form a semi-conductive layer of a wire or cable. This is preferably done at a line speed of at least 20 m/min, more preferably at least 50 m/min. The pressure used for the extrusion is 50 to 500 bar.

When producing a power cable by extrusion, the polymer composition can be applied onto the metallic conductor and/or on at least one coating layer thereof, e.g. an insulating layer.

In the production of a power cable comprising a conductor, an insulating layer and at least one semi-conductive layer, the inventive semi-conductive copolymer composition is contained in at least one of said semi-conductive layers.

The power cable comprising the semi-conductive copolymer composition of the present invention may further comprise additional layers such as water barrier layers and a sheath layer.

Preferably, at least the outermost semi-conductive layer of a power cable is formed by the composition as described above.

Finally, the present invention relates to the use of a semiconducting polymer composition as described above for the production of a semi-conductive layer of an electric power cable, preferably a medium to high voltage electric power cable.

Test Methods

Unless otherwise stated in the description or claims, the following methods were used to measure the properties defined generally above and in the claims and in the examples below. The samples were prepared according to given standards, unless otherwise stated.

(a) Melt Flow Rate

The melt flow rate (MFR) is determined according to ISO 1133. The MFR is measured with a load of 21.6 Kg at 190° C. and/or with a load of 2.16 Kg at 130° C.

(b) Co-Monomer Content i) Comonomer Content in Copolymer of Polypropylene:

Quantitative Fourier transform infrared (FTIR) spectroscopy is used to quantify the amount of comonomer. Calibration is achieved by correlation to comonomer contents determined by quantitative nuclear magnetic resonance (NMR) spectroscopy.

The calibration procedure based on results obtained from quantitative 13C-NMR spectroscopy is undertaken in the conventional manner as well documented in the literature.

The amount of comonomer (N) was determined as weight percent (wt %) according to the following formula:

$$N = k1(A/R) + k2$$

Wherein A is the maximum absorbance defined of the co-monomer band, R is the maximum absorbance defined as peak height of the reference peak and with k1 and k2 the linear constants obtained by calibration.

The band used for ethylene content quantification is selected depending if the ethylene content is random (730 cm$^{-1}$) or block-like (as in heterophasic PP copolymer) (720 cm$^{-1}$). The absorbance at 4324 cm$^{-1}$ is used as a reference band.

ii) Co-Monomer Content of Polar Comonomers in Low Density Polyethylene

Polymers Containing a Polar Co-Monomer Units >6 Wt %

Co-monomer content (wt %) is determined in a known manner based on Fourier transform infrared spectroscopy (FTIR) determination calibrated with quantitative nuclear magnetic resonance (NMR) spectroscopy. Hereafter the determination of the polar comonomer content of ethylene ethyl acrylate, ethylene butyl acrylate and ethylene methyl acrylate is exemplified.

Film samples of the polymers is prepared for the FTIR measurement: 0.5-0.7 mm film thickness is used for ethylene butyl acrylate and ethylene ethyl acrylate and 0.10 mm film thickness for ethylene methyl acrylate in amount of >6 wt %. Films are pressed using a Specac film press at 150° C., approximately at 5 tons, 1-2 minutes, and then cooled with cold water in a not controlled manner. The accurate thickness of the obtained film samples is measured.

After the analysis with FTIR, base lines in absorbance mode are drawn for the peaks to be analysed. The absorbance peak for the co-monomer is normalised with the absorbance peak of polyethylene (e.g. the peak height for butyl acrylate or ethyl acrylate at 3450 cm$^{-1}$ is divided with the peak height of polyethylene at 2020 cm$^{-1}$). The NMR spectroscopy 10 calibration procedure is undertaken in the conventional manner as well documented in the literature.

For the determination of the content of methyl acrylate a 0.10 mm thick film sample is prepared. After the analysis the maximum absorbance for the peak for the methylacrylate at 3455 cm$^{-1}$ is subtracted with the absorbance value for the base line at 2475 cm$^{-1}$ (Amethylacrylate—A2475). Then the maximum absorbance peak for the polyethylene peak at 2660 cm$^{-1}$ is subtracted with the absorbance value for the base line at 2475 cm$^{-1}$ (A2660—A2475). The ratio between (Amethylacrylate—A2475) and (A2660—A2475) is then calculated in the conventional manner as well documented in the literature.

The weight-% may be converted to mol-% by calculation as well documented in the literature.

Quantification of Copolymer Content in Polymers by NMR Spectroscopy

The co-monomer content is determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York).

Experimental parameters is adjusted to ensure measurement of quantitative spectra for this specific task (e.g "200 and More NMR Experiments: A Practical Course", S. Berger and S. Braun, 2004, Wiley-VCH, Weinheim). Quantities are calculated using simple corrected ratios of the signal integrals of representative sites in a manner known in the art.

Polymers Containing 6 Wt % or Less Polar Co-Monomer Units

Co-monomer content (wt %) is determined in a known manner based on Fourier transform infrared spectroscopy (FTIR) determination calibrated with quantitative nuclear magnetic resonance (NMR) spectroscopy. Hereafter, the determination of the polar comonomer content of ethylene butyl acrylate and ethylene methyl acrylate is exemplified. For the FT-IR measurement a film samples of 0.05 to 0.12 mm thickness are prepared as described above. The accurate thickness of the obtained film samples is measured.

After the analysis with FT-IR, base lines in absorbance mode are drawn for the peaks to be analysed. The maximum absorbance for the peak for the comonomer (e.g. for methylacrylate at 1164 cm$^{-1}$ and butylacrylate at 1165 cm$^{1}$) is subtracted with the absorbance value for the base line at 1850 cm$^{-1}$ (Apolar comonomer—A1850). Then the maximum absorbance peak for polyethylene peak at 2660 cm$^{-1}$ is subtracted with the absorbance value for the base line at 1850 cm$^{-1}$ (A2660—A1850). The ratio between (Acomonomer—A1850) and (A2660—A1850) is then calculated. The NMR spectroscopy calibration procedure is undertaken in the conventional manner which is well documented in the literature, as described above.

The weight-% may be converted to mol-% by calculation as well documented in the literature.

(c) Atacticity and Isotacticity

Quantification of Microstructure by NMR Spectroscopy

Quantitative nuclear-magnetic resonance (NMR) spectroscopy is used to quantify the isotacticity of the polypropylene homo-polymers and the ethylene content of the ethylene-propylene copolymers.

Quantitative $^{13}C\{^{1}H\}$ NMR spectra are recorded in the solution-state using a Bruker Advance III 400 NMR spectrometer operating at 400.15 and 100.62 MHz for $^{1}H$ and $^{13}C$ respectively. All spectra are recorded using a $^{13}C$ optimised 10 mm extended temperature probe head at 125° C. using nitrogen gas for all pneumatics.

For polypropylene homo-polymers approximately 200 mg of material is dissolved in 1,2-tetrachloroethane-d$_2$ (TCE-d$_2$). To ensure a homogenous solution, after initial sample preparation in a heat block, the NMR tube is further heated in a rotary oven for at least 1 hour. Upon insertion into the magnet the tube is spun at 10 Hz. This setup is chosen primarily for the high resolution needed for tacticity distribution quantification. {Busico, V., Cipullo, R., Prog. Polym. Sci. 26 (2001) 443; Busico, V., Cipullo, R., Monaco, G., Vacatello, M., Segre, A. L., Macromolecules 30 (1997) 6251} Standard single-pulse excitation is employed utilising the NOE and bi-level WALTZ16 decoupling scheme {Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128}. A total of 8192 (8 k) transients are acquired per spectra.

For ethylene-propylene copolymers approximately 200 mg of material is dissolved in 3 ml of 1,2-tetrachloroethane-d2 (TCE-d$_2$) along with chromium-(III)-acetylacetonate (Cr (acac)$_3$) resulting in a 65 mM solution of relaxation agent in solvent {Singh, G., Kothari, A., Gupta, V., Polymer Testing 28 5 (2009), 475}. To ensure a homogenous solution, after initial sample preparation in a heat block, the NMR tube is further heated in a rotary oven for at least 1 hour. Upon insertion into the magnet the tube is spun at 10 Hz. This setup is chosen primarily for the high resolution and quantitatively needed for accurate ethylene content quantification. Standard-single-pulse excitation is employed without NOE, using an optimised tip angle, 1 s recycle delay and a bi-level WALTZ16 decoupling scheme {Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128}. A total of 6144 (6 k) transients are acquired per spectra.

Quantitative $^{13}C\{^{1}H\}$ NMR spectra are processed, integrated and relevant quantitative properties determined from the integrals using proprietary computer programs.

For ethylene-propylene copolymers all chemical shifts are indirectly referenced to the central methylene group of the ethylene block (EEE) at 30.00 ppm using the chemical shift of the solvent. This approach allows comparable referencing even when this structural unit is not present.

For polypropylene homopolymers all chemical shifts are internally referenced to the methyl isotactic pentad (mmmm) at 21.85 ppm.

Characteristic signals corresponding to regio defects {Resconi, L., Cavallo, L., Fait, A., Piemontesi, F., Chem. Rev. 2000, 100, 1253; Wang, W J., Zhu, S., Macromolecules 33 (2000), 1157; Cheng, H. N., Macromolecules 17 (1984), 1950} are not observed.

The tacticity distribution is quantified through integration of the methyl region between 23.6-19.7 ppm correcting for any sites not related to the stereo sequences of interest. Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

The triad tacticity distribution is determined through direct separate integration of each methyl signals from a given steric triad followed by normalisation to the sum of methyl signal from all steric triads. The relative content of a specific steric triad is reported as the mole fraction or percentage of a given steric triad xx with respect to all steric triads:

$$[xx]=xx/(mm+mr+rr)$$

The triad isotacticity is thus given by:

$$[mm]=mm/(mm+mr+rr)$$

When appropriate integrals are corrected for the presence of sites not directly associated with steric triads.

For copolymers characteristic signals corresponding to the incorporation of ethylene are observed {Cheng, N., Macromolecules 17 (1984), 1950}.

The mole fraction of ethylene in the polymer is quantified using the method of Wang et. al. {Wang, W-J., Zhu, S., Macromolecules 33 (2000), 1157} through integration of multiple signals across the whole spectral region of a $^{13}C\{^1H\}$ spectra acquired using defined conditions. This method is chosen for its accuracy, robust nature and ability to account for the presence of regio-defects when needed. Integral regions are slightly adjusted to increase applicability to a wider range of co-monomer contents.

The mole percent co-monomer incorporation in the polymer is calculated from the mole fraction according to:

$$E[\text{mol \%}]=100*fE$$

The weight percent comonomer incorporation in the polymer is calculated from the mole fraction according to:

$$E[\text{wt \%}]=100*(fE*28.05)/((fE*28.05)+((1-fE)*42.08))$$

(d) Degree of Crystallinity/Melting Temperature

Melting temperature and degree of crystallinity are measured according to ISO11357-3: 1999: Plastics—Differential scanning calorimetry (DSC)—Part 3: Determination of temperature and enthalpy of melting and crystallization. The differential scanning calorimetry device used is a Mettler TA820 on 3±0.5 mg samples. Crystallization and melting temperature are obtained during 10° C./min cooling and heating scans between 30° C. and 225° C. Melting and crystallization temperatures are taken as the peaks of the endotherms and exotherms. The degree of crystallinity is determined by quantifying the heat associated with melting (enthalpy of fusion). This heat is reported as percent crystallinity by normalizing the observed heat of fusion to that of a 100% crystalline polypropylene, i.e. 209 J/g.

(e) The Volume Resistivity (VR)

The volume resistivity (VR) is measured on strings which are extruded from the die during compounding. The procedure is as follows:

The strings have a diameter D between 1 and 10 mm, preferably around 3 mm, and a length L of 10 to 1000 mm, preferably around 100 mm. The diameter is measured using calipers and the length with a ruler, both recorded in centimetres. The resistance R is measured in ohms using an ohm-meter.

The area A is calculated as $$A=\pi*(D/2)^2.$$

The Volume Resistivity

Volume Resistivity is calculated as $$VR=R*A/L.$$

(f) Molecular Weight Averages, Molecular Weight Distribution, Long Chain Branching Molecular weight averages (Mw, Mn), Molecular weight distribution (MWD) and its broadness, described by polydispersity index, PDI=Mw/Mn (wherein Mn is the number average molecular weight and Mw is the weight average molecular weight) are determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT) is used. 3× Olexis and 1× Olexis Guard columns from Polymer Laboratories as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min is applied. 200 μL of sample solution are injected per analysis. The corresponding detector constants as well as the inter detector delay volumes are determined with a narrow PS standard (MWD=1.01) with a molar mass of 132900 g/mol and a viscosity of 0.4789 dl/g. The corresponding do/dc for the used PS standard in TCB is 0.053 cm³/g.

The column set is calibrated using universal calibration (according to ISO 16014-2:2003) with at least 15 narrow MWD polystyrene (PS) standards in the range of 0.5 kg/mol to 11,500 kg/mol. The corresponded intrinsic viscosities of the PS standards were calculated from the concentration and the corresponded signal of the online viscometer and the detector constants.

The molecular weight of the sample ($M_2$) at each chromatographic slice using the universal calibration approach may be calculated by the following correlation:

$$\log M_1[\eta_1]=V_R=\log M_2[\eta_2]$$

with:

$M_1$ Molar mass of PS
$\eta_1$ intrinsic viscosity of the PS
$M_2$ Molar mass of sample
$\eta_2$ intrinsic viscosity of sample
$V_R$ Retention volume For the low and high molecular region in which less signal of the online viscometer detector or RI detector respectively is achieved a linear fit is used to correlate the elution volume to the corresponding molecular weight.

All data processing and calculation is performed using the Cirrus Multi-Offline SEC-Software Version 3.2 (Polymer Laboratories a Varian inc. Company).

All samples are prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking.

h) Surface Smoothness

The compounds are extruded into tapes about 1 mm thick and 200 mm wide. They are on-line inspected by an automated optical system. Thus about 1 m² tape of each sample was evaluated and the result is expressed in number of surface protuberances per square meter corresponding to a size class of protuberances: >150 μm (NOP0), >200 μm (NOP1), >300 μm (NOP2), >400 μm (NOP3), >500 μm (NOP4).

Examples

The present invention will now be described in more detail by reference to the following examples and comparative examples.

Samples #1 to #21

In the samples of Table 1 commercial EVAs and a Borealis waste atactic Polypropylene (aPP) or ethylene-propylene copolymer (EPP) are used.

The atactic polypropylene (aPP) used in samples #11 to #14 has a 70.2% of atactic component and 29.8% isotactic component. It has $M_w$ of 33000 and $M_n$ of 3000. It features a degree of crystallinity of 0.45% and a melting temperature of 153.36° C.

The trade name for the atactic polypropylene is SCRPPL01N. The material is made via a second generation Ziegler Natta catalyst, based on Ti—Cl without Si—Mg carrier called Lynx 900 (this produces mainly isotactic PP, with a small amount of atactic PP (<5%) as a by product).

The ethylene-propylene copolymer (EPP) used in samples #7 to #10 has a polyethylene content of 8.6 wt % and a polypropylene content of 91.4 wt %. It has a 21.78% of atactic component and 78.22% isotactic component. It has $M_w$ of 17000 and $M_n$ of 8000. It features a degree of crystallinity of 10% and a melting temperature of 80.1° C. The trade name for the ethylene-propylene copolymer (EPP) used is Licocene™ PP 1502 from Clariant, made by a metallocene type catalyst.

CB in Table 1 stands for Condutex® 7051 Ultra®. It is a specific type of carbon black used as conductive filler (C). As indicated in the product's data sheet, it has a mean particle size of 56 nm. The iodine number is 43 g/Kg.

EVA 1 in Table 1 stands for Escorene™ Ultra FL 02020 and corresponds to component (A). As indicated in the product's data sheet the ethylene vinyl acetate copolymer resin has a vinyl acetate content of 20.0 wt %, density of 0.940 g/cm³ and a melt index of 20.0 g/10 min.

EVA 2 in Table 1 stands for Flexaren® 14010 and corresponds to component (A). As indicated in the product's data sheet the ethylene vinyl acetate copolymer resin has a vinyl acetate content of 14.0 wt %, density of 0.934 g/cm³ and a melt index of 10 g/10 min.

EVA 3 in Table 1 stands for Escorene™ Ultra FL 00909 and corresponds to component (A). As indicated in the product's data sheet the ethylene vinyl acetate copolymer resin has a vinyl acetate content of 9.4 wt %, density of 0.928 g/cm³ and a melt index of 9.0 g/10 min.

EBA in Table 1 is ethylene butylacrylate copolymer. It has a butylacrylate content of 13 wt %, density of 0.924 g/cm³ and a melt index of 21 g/10 min. Each sample was stabilized by 0.8 wt % of polymerized 2,2,4-trimethyl-1,2,dihydroquinoline (TMQ), having a melting point of 80-135° C. (CAS: 26780-96-1).

The formulations as described in Table 1 have been compounded using a BUSS MKD 46B/15LD compounder at 170° C. for approximately 2 minutes at a screw speed of 210 rpm. Mixing of the polymers with CB is done at the same time ensuring proper mixing and allowing the filler particles enough mobility for adequate localization in the preferential phase. Final blends are cooled down with water at room temperature and pelletized for easier use.

Samples #1 to #6 and #15 to #21 are used as reference as they do not include either aPP or EPP. Samples #7 to #10 contain EPP and samples #11 to #14 contain aPP.

All the samples #7 to #14 are designed to have the same volume resistivity performance of Samples #1 to #6 (i.e. 38 or 40 wt % CB).

TABLE 1

| Sample | EVA1 wt % | EVA2 wt % | EVA3 wt % | EBA wt % | aPP wt % | EPP wt % | CB wt % | VR Ohm/cm | $MFR_{21.6\,Kg,130°\,C.}$ g/10 min |
|---|---|---|---|---|---|---|---|---|---|
| #1 | 59.2 | | | | | | 40 | 5.6 | 5.22 |
| #2 | | 59.2 | | | | | 40 | 10.1 | 3.3 |
| #3 | | | 61.1 | | | | 38 | 22.8 | 5.53 |
| #4 | | 59.2 | | | | | 40 | 6.4 | 5.3 |
| #5 | | | | 59.2 | | | 40 | 4 | 6.8 |
| #6 | | | | 61.2 | | | 38 | 10.53 | 5.3 |
| #7 | | | | 57 | | 5 | 38 | 15.1 | 19 |
| #8 | | | | 53.2 | | 10 | 36 | 13.1 | 40 |
| #9 | 53.2 | | | | | 10 | 36 | 5 | 25 |
| #10 | 41.2 | | | | | 30 | 28 | 5 | Too high |
| #11 | | 53.2 | | | 10 | | 36 | 16.2 | 16.52 |
| #12 | | 47.2 | | | 20 | | 32 | 53.4 | 56.4 |
| #13 | 53.2 | | | | 10 | | 36 | 25.6 | 23.55 |
| #14 | 47.2 | | | | 20 | | 32 | 19.3 | 65.9 |
| #15 | | | | 74.2 | | | 25 | 1831.2 | 35 |
| #16 | | | | 72.2 | | | 27 | 689.4 | 27.3 |
| #17 | | | | 69.2 | | | 30 | 815.1 | 24.56 |
| #18 | 74.2 | | | | | | 25 | 2512 | 35.8 |
| #19 | 68.2 | | | | | | 31 | 444.3 | 21.5 |
| #20 | 67.2 | | | | | | 32 | 410.2 | 20.5 |
| #21 | 66.2 | | | | | | 33 | 235.8 | 16 |

FIG. 1 reports graphically the VR and MFR results of Table 1.

Figure 2:
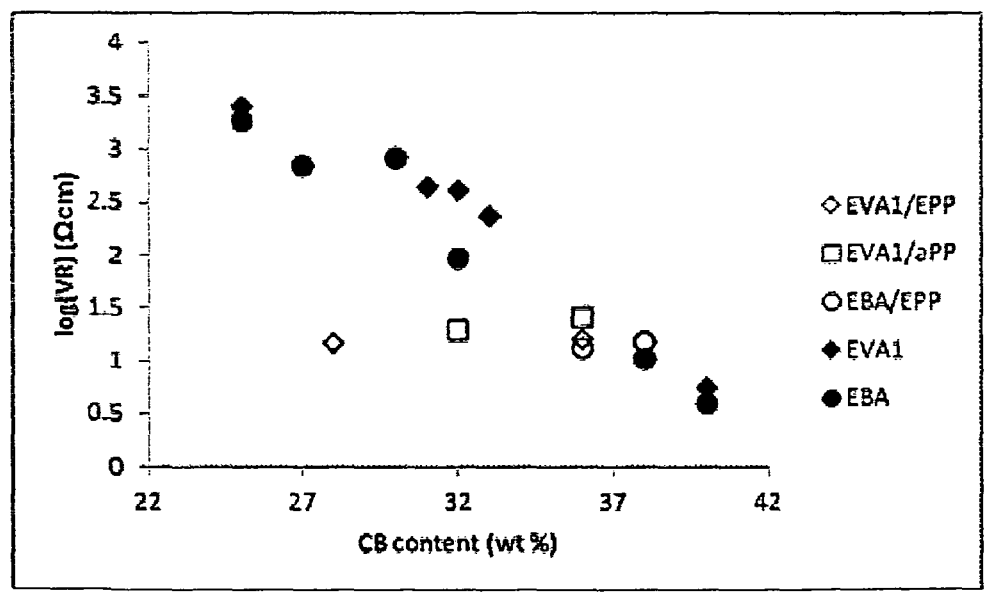

FIG. 2 reports graphically the VR versus CB of the samples in Table 1.

Table 1 and FIG. 1 also show that the VR increases slightly in the blends containing aPP, but it is still comparable and within the predefined limit of approximately 100 Ω/cm.

It should be noted that in the reference samples #1 to #6, the CB loading is 38 or 40 wt %, and by adding EPP or aPP, it is possible to lower it to approximately 30-36 wt % without significantly sacrificing electrical performance.

In fact, when the amount of CB is decreased but no EPP or aPP is added to the composition as in samples #15 to #21 the volume resistivity increases to an unacceptable level well above 100 Ωcm.

The big change with respect to performances can be seen in the MFR measurements. When using the EPP or aPP, the MFR values dramatically increase. The increase is seen for all types of EVAs and EBAs. In FIG. 1 the MFR values of samples containing EVA, EBA, aPP or EPP are graphically reported.

In summary, the semi-conductive polymer compositions of EVA, EBA, aPP and CB have the following advantageous feature:
Similar volume resistivity despite lower CB concentration;
Better processability as seen by higher melt flow index;
Lower material cost;
when compared with the basic EVA-based semiconducting solutions.

The semi-conductive polymer compositions of EVA, EBA, EPP and CB have the following advantageous feature:
Identical electrical performances despite lower CB concentration;
Better processability as seen by higher melt flow index;
Similar cost;
when compared with the basic EVA/EBA-based semiconducting solutions.

Samples #22 and #23

EMA in Table 2 stands for a conventional copolymer of ethylene with methyl acrylate polymer produced in a tabular reactor of a high pressure polymerization process. It has a MFR (2.16 Kg, 190° C.) of 4 g/10 min and a melting temperature of 105° C. Methyl Acrylate content is of 8 wt %.

CB in Table 2 stands for "Denka Black" carbon black. It is a commercially available granulated acetylene carbon black of carbon black used as conductive filler (C). It has a mean particle size of 35 nm (ASTM D3849-95a procedure D). The iodine number is 93 mg/g (ASTM D1510-07). The DBP absorption number is of 200 ml/100 g (ASTM D2414-06a).

The ethylene-propylene copolymer (EPP) used has a polyethylene content of 8.6 wt % and a polypropylene content of 91.4 wt %. It has a 21.78% of atactic component and 78.22% isotactic component. It has $M_w$ of 17000 and $M_n$ of 8000. It features a degree of crystallinity of 10% and a melting temperature of 80.1° C. The trade name for the ethylene-propylene copolymer (EPP) used is Licocene™ PP 1502 from Clariant, made by a metallocene type catalyst.

The formulations as described in Table 2 have been compounded using a BUSS kneader L603 at 170° C. for approximately 2 minutes at a screw speed of 210 rpm. Mixing of the polymers with CB is done at the same time ensuring proper mixing and allowing the filler particles enough mobility for adequate localization in the preferential phase. Final blends are cooled down with water at room temperature and pelletized for easier use.

Sample #22 is used as reference as it does not include EPP. Sample #17 contains EPP. Both samples include 0.8 wt % of antioxidant (polymerized 2,2,4-trimethyl-1,2-dihydroquinoline, having a melting point of 80-135° C. (CAS: 26780-96-1).

TABLE 2

| Sample | EMA wt % | EPP wt % | CB wt % | VR25 Ohm/cm | MFR$_{21.6\,Kg\,130°\,C.}$ g/10 min | NOP 0 | NOP 1 | NOP 2 | NOP 3 | NOP 4 |
|---|---|---|---|---|---|---|---|---|---|---|
| #22 | 69.2 |  | 30 | 45.9 | 24.8 | 28 | 9 | 3 | 2 | 2 |
| #23 | 65.2 | 4.0 | 30 | 63.9 | 70.0 | 48 | 15 | 0 | 0 | 0 |

As seen in Table 2 the MFR of the sample containing EPP is dramatically increased while the VR is only marginally affected by the inclusion of EPP. The higher MFR results in a lower compounding pressure. Concerning surface smoothness, the data show that the inclusion of EPP gives smaller protuberances and the number of large surface irregularities is significantly decreased, resulting in an improved surface smoothness.

The invention claimed is:

1. A semi-conductive polymer composition consisting of:
(A) an ethylene-methyl acrylate (EMA) copolymer, present in an amount from 45 to 65 wt % of the total polymer composition;
(B) an atactic polypropylene homopolymer, present in an amount from 1 to 10 wt % of the total polymer composition;
(C) carbon black, present in an amount from 20 to 37 wt % of the total polymer composition;
(D) optionally a cross-linking agent; and
(E) optionally at least one further additive selected from the group consisting of antioxidants, scorch retarders, cross-linking boosters, stabilizers, processing aids, flame retardant additives, acid scavengers, inorganic fillers, voltage stabilizers, and additives for improving water tree resistance;
wherein the atactic polypropylene homopolymer (B) has a degree of crystallinity below 20%; and
wherein the atactic polypropylene homopolymer (B) has a Mw below 50,000.

2. The composition according to claim 1 wherein the atactic polypropylene homopolymer (B) has a degree of crystallinity below 12%.

3. The composition according to claim 1 satisfying the following relationship: MFR(21.6 Kg 130° C.)≥11.5× log (VR), or MFR(21.6 Kg 130° C.)≥19.5*VR+3.

4. The composition according to claim 1 having a MFR (21.6 Kg 130° C.) higher than 15 g/10 min.

5. A wire or cable having a coating thereon which comprises the composition of claim 1.

6. A process for forming a semi-conductive layer on a wire or cable comprising extruding the composition of claim 1 on a metallic conductor or on at least one coating layer thereof.

7. The composition according to claim 1, wherein the Mw of the atactic polypropylene homopolymer (B) is below 35,000.

8. The composition according to claim 1, wherein the amount of the atactic polypropylene homopolymer (B) is from 5 to 10 wt % of the total polymer composition.

9. The composition according to claim 1, wherein the degree of crystallinity of the atactic polypropylene homopolymer (B) is below 0.8%.

10. The composition according to claim 1, wherein the degree of crystallinity of the atactic polypropylene homopolymer (B) is below 0.5%.

11. The composition according to claim 1, wherein the carbon black is a furnace carbon black having an ash-content of less than 0.05 wt % measured according to ASTM-1506, a 325 mesh sieve residue of less than 15 ppm measured according to ASTM D-1514, and less than 0.05 wt % total sulfur measured according to ASTM 1619.

12. The composition according to claim 1, wherein the carbon black is present in an amount of at least 30 wt % and less than 33 wt % of the total polymer composition.

13. The composition according to claim 1, wherein the carbon black is present in an amount of 30 wt % to 36 wt % of the total polymer composition; and wherein the EMA copolymer is present in an amount of 47.2 wt % to 53.2 wt % of the total polymer composition.

14. The composition according to claim 1, wherein a majority of the carbon black (C) is located in the EMA copolymer (A).

15. The composition of claim 1, wherein the atactic polypropylene homopolymer has at least 70% of an atactic component.

16. A semi-conductive polymer composition consisting of:
(A) an ethylene-methyl acrylate (EMA) copolymer, present in an amount from 45 to 65 wt % of the total polymer composition;
(B) an atactic polypropylene homopolymer, present in an amount from 1 to 10 wt % of the total polymer composition;
(C) carbon black, present in an amount from 30 wt % to 36 wt % of the total polymer composition;
(D) optionally a cross-linking agent; and
(E) optionally at least one further additive selected from the group consisting of antioxidants, scorch retarders, cross-linking boosters, stabilizers, processing aids, flame retardant additives, acid scavengers, inorganic fillers, voltage stabilizers, and additives for improving water tree resistance;
wherein the atactic polypropylene homopolymer (B) has a degree of crystallinity below 0.5%; and
wherein the atactic polypropylene homopolymer (B) has a Mw below 35,000.

17. The semi-conductive composition of claim 16, wherein the atactic polypropylene homopolymer has at least 70% of an atactic component.

18. The composition of claim 17, wherein the atactic polypropylene homopolymer has at least 70% of an atactic component.

* * * * *